United States Patent
Hirai

(10) Patent No.: US 8,289,442 B2
(45) Date of Patent: Oct. 16, 2012

(54) TELEVISION CAMERA SYSTEM AND TELEVISION LENS APPARATUS

(75) Inventor: Keisuke Hirai, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 586 days.

(21) Appl. No.: 12/302,401

(22) PCT Filed: Sep. 26, 2008

(86) PCT No.: PCT/JP2008/067980
§ 371 (c)(1),
(2), (4) Date: Nov. 25, 2008

(87) PCT Pub. No.: WO2009/044837
PCT Pub. Date: Apr. 9, 2009

(65) Prior Publication Data
US 2010/0231778 A1 Sep. 16, 2010

(30) Foreign Application Priority Data
Oct. 2, 2007 (JP) ................. 2007-258293

(51) Int. Cl.
H04N 5/225 (2006.01)
(52) U.S. Cl. ............. 348/372; 396/303; 323/234
(58) Field of Classification Search .......... 348/335, 348/360, 361, 372; 396/301, 303; 323/234; 399/88
See application file for complete search history.

(56) References Cited

U.S. PATENT DOCUMENTS

| | | | | |
|---|---|---|---|---|
| 6,031,999 A | * | 2/2000 | Ogawa | 396/303 |
| 6,876,393 B1 | * | 4/2005 | Yokonuma | 348/372 |
| 7,042,499 B1 | * | 5/2006 | Kido et al. | 396/303 |
| 7,148,655 B2 | | 12/2006 | Ebato et al. | |
| 7,546,033 B2 | * | 6/2009 | Kawada | 396/301 |

FOREIGN PATENT DOCUMENTS

| | | |
|---|---|---|
| JP | H02-294606 A | 12/1990 |
| JP | H06-086146 A | 3/1994 |
| JP | 09-304680 A | 11/1997 |
| JP | 2000-171875 A | 6/2000 |
| JP | 2003-240830 A | 8/2003 |
| JP | 2003-264723 A | 9/2003 |
| JP | 2004-138890 A | 5/2004 |

OTHER PUBLICATIONS

International Search Report concerning appln PCT/JP2008/067980 dated Dec. 22, 2008.
Opinion of International Searching Authority concerning appln PCT/JP2008/067980 dated Dec. 22, 2008.

* cited by examiner

Primary Examiner — Clayton E Laballe
Assistant Examiner — Leon W Rhodes, Jr.
(74) Attorney, Agent, or Firm — Canon USA Inc IP Division

(57) ABSTRACT

In S104, it is determined whether an instruction has been input to drive a wiper serving as an optional member. If a wiper driving instruction has been input, the process shifts to S105 to perform wiper driving control. If no wiper driving instruction has been input, the process shifts to S106. In S106, it is determined whether the wiper is during driving. If the wiper is during driving, the process shifts to S107. If the wiper is not during driving, the process shifts to S113. In S107, it is determined whether information of the capacity of current suppliable from a television camera (2) to a television lens (1) has been output. Also in S107, the current capacity information is monitored. If no current capacity information has been output or the current capacity is small, the process shifts to S108 to stop driving control of a focus lens and zoom lens.

6 Claims, 9 Drawing Sheets

FIG. 3

| CURRENT CAPACITY INFORMATION OUTPUT DETERMINATION RESULT | PRESENCE OF OUTPUT | | ABSENCE OF OUTPUT |
|---|---|---|---|
| CURRENT CAPACITY INFORMATION MONITORING RESULT | CURRENT : LARGE CAPACITY | CURRENT : SMALL CAPACITY | — |
| FOCUS DRIVING DURING WIPER DRIVING | PERMIT / INHIBIT | INHIBIT | INHIBIT |
| ZOOM DRIVING DURING WIPER DRIVING | PERMIT / INHIBIT | INHIBIT | INHIBIT |

FIG. 6

| CURRENT CAPACITY INFORMATION OUTPUT DETERMINATION RESULT | PRESENCE OF OUTPUT | | | | | | ABSENCE OF OUTPUT | | |
|---|---|---|---|---|---|---|---|---|---|
| CURRENT CAPACITY INFORMATION MONITORING RESULT | CURRENT CAPACITY LARGE | | | CURRENT CAPACITY SMALL | | | — | | |
| CURRENT CAPACITY INFORMATION OUTPUT DETERMINATION RESULT FOR AUXILIARY POWER SOURCE UNIT | PRESENCE OF OUTPUT | | ABSENCE OF OUTPUT | PRESENCE OF OUTPUT | | ABSENCE OF OUTPUT | PRESENCE OF OUTPUT | | ABSENCE OF OUTPUT |
| CURRENT CAPACITY INFORMATION MONITORING RESULT FOR AUXILIARY POWER SOURCE UNIT | CURRENT CAPACITY LARGE | CURRENT CAPACITY SMALL | — | CURRENT CAPACITY LARGE | CURRENT CAPACITY SMALL | — | CURRENT CAPACITY LARGE | CURRENT CAPACITY SMALL | — |
| HIGH-SPEED ZOOM DRIVING CONTROL | PERMIT | | | PERMIT | INHIBIT | | PERMIT | INHIBIT | INHIBIT |

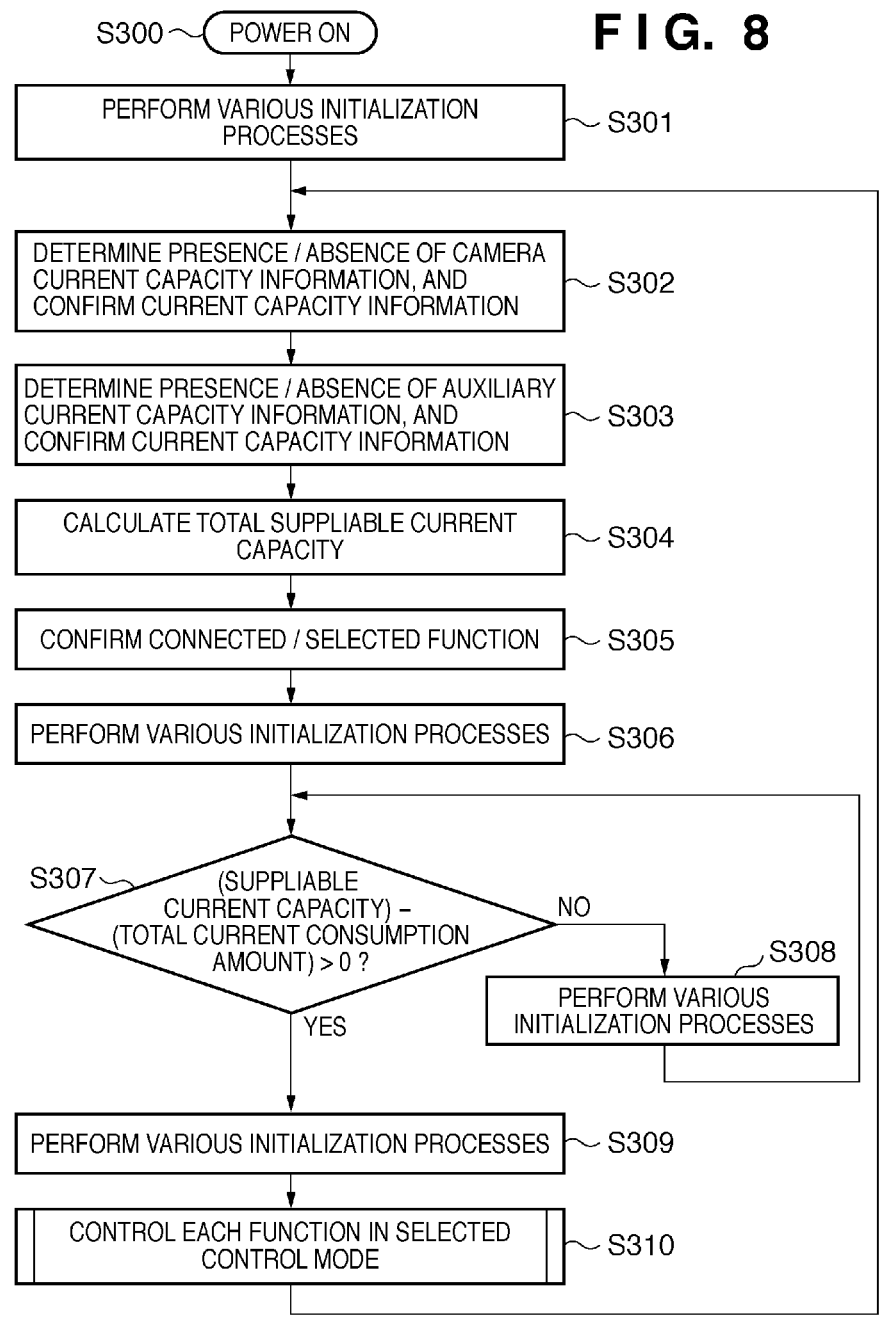

FIG. 9

| CONTROL MODE ID | Z | F | I | IE | AF | IS | HS | WP | HT | DZD | DFD |
|---|---|---|---|---|---|---|---|---|---|---|---|
| 1 | A | A | A | A | A | A | A | A | A | a | a |
| 2 | A | A | A | A | A | A | A | A | A | a | b |
| 3 | A | A | A | A | A | A | A | A | A | b | b |
| 4 | A | A | A | A | A | A | A | A | B | b | b |
| 5 | A | A | A | A | A | A | A | B | B | b | b |
| 6 | A | A | A | A | A | A | B | B | B | b | b |
| 7 | A | A | A | A | A | B | B | B | B | b | b |
| 8 | A | A | A | A | B | B | B | B | B | b | b |
| 9 | A | A | A | B | B | B | B | B | B | b | b |
| 10 | A | A | B | B | B | B | B | B | B | b | b |
| 11 | A | B | B | B | B | B | B | B | B | b | c |
| 12 | B | B | B | B | B | B | B | B | B | c | c |
| 13 | B | B | B | B | B | B | B | B | C | c | c |
| 14 | B | B | B | B | B | B | B | C | C | c | c |
| 15 | B | B | B | B | B | B | C | C | C | c | c |
| 16 | B | B | B | B | B | C | C | C | C | c | c |
| 17 | B | B | B | B | C | C | C | C | C | c | c |
| 18 | B | B | B | C | C | C | C | C | C | c | c |
| 19 | B | B | C | C | C | C | C | C | C | c | c |
| 20 | B | C | C | C | C | B | C | C | C | c | d |
| 21 | C | C | C | C | C | C | C | C | C | d | d |
| 22 | C | C | C | C | C | C | C | C | D | d | d |
| 23 | C | C | C | C | C | C | C | D | D | d | d |
| 24 | C | C | C | C | C | C | D | D | D | d | d |
| 25 | C | C | C | C | C | D | D | D | D | d | d |
| 26 | C | C | C | C | D | D | D | D | D | d | d |
| 27 | C | C | C | D | D | D | D | D | D | d | d |
| 28 | C | C | D | D | D | D | D | D | D | d | d |
| 29 | C | D | D | D | D | D | D | D | D | d | d |

| | |
|---|---|
| Z | ZOOM DRIVING |
| F | FOCUS DRIVING |
| I | IRIS DRIVING |
| IE | EXTENDER DRIVING |
| AF | AUTO FOCUS CONTROL |
| IS | ANTI-VIBRATION CONTROL |
| HS | HIGH-SPEED ZOOM DRIVING |
| WP | WIPER DRIVING |
| HT | HEATER FUNCTION |
| A | PERMISSION OF SIMULTANEOUS DRIVING |
| B | CONDITIONAL PERMISSION OF SIMULTANEOUS DRIVING |
| C | PERMISSION OF ONLY SINGLE CONTROL |
| D | INHIBITION OF DRIVING |

| | |
|---|---|
| DZD | DIGITAL ZOOM DEMAND |
| DFD | DIGITAL FOCUS DEMAND |
| a | ALL FUNCTIONS = VALID |
| b | DECREASE IN DISPLAY BRIGHTNESS |
| c | LED = INVALID |
| d | DISPLAY = INVALID |

TELEVISION CAMERA SYSTEM AND TELEVISION LENS APPARATUS

TECHNICAL FIELD

The present invention relates to a television camera system in which the zoom, focus, iris, and the like are driven and controlled by a plurality of instruction apparatuses, and particularly a television lens is fixed to or detachable from a television camera, and a television lens apparatus.

BACKGROUND ART

Conventional techniques regarding the current capacity of a television lens are disclosed in, for example, Japanese Patent Laid-Open Nos. 9-304680 and 2000-171875. Japanese Patent Laid-Open No. 9-304680 discloses a television lens apparatus which adopts a switch to set the current limiting value of a camera. When a current having a set value is equal to or smaller than 2 A (ampere), for example, zooming and focusing operations are inhibited during the operation of an extender, thereby stably performing each operation.

Japanese Patent Laid-Open No. 2000-171875 discloses a television lens apparatus which switches the operation limitation stepwise to acceleration limitation, stop immediately before mechanical limitation, inhibition of simultaneous operations, and the like in accordance with the maximum current detection result.

As recent television lens systems become multifunctional, increase the zooming speed, improve the servo performance, and use optional members, power consumption is increasing. Conventional television lens systems deal with an increasing amount of power consumption by connecting an auxiliary power source to a television lens or imposing function restriction, but this is not convenient for the user. Thus, the latest television cameras compensate for current shortage by increasing a supply current to a television lens. For example, the amount of supply current from a television camera to a television lens has generally been 2 A, but models capable of supplying a current up to 3 or 4 A are becoming available.

However, there are only a limited number of television cameras compatible with the above-mentioned television lens consuming a large amount of power. Depending on a combination of a television camera and television lens, functions are restricted though the current supply is sufficient, failing in control fully using the amount of current supply. If a television lens consuming a large amount of current is connected to an incompatible television camera, no sufficient amount of current can be supplied, and the operation of the television lens becomes unstable. In the worst case, the television camera may fail.

Japanese Patent Laid-Open No. 9-304680 discloses a television lens apparatus capable of setting the current limiting value of a mounted television lens. However, every time the television camera on which the television lens is mounted changes, the user needs to cumbersomely confirm the specifications of the television camera and set the current limiting value again. If a set current limiting value is not proper, the television camera may not operate normally, and in the worst case, may fail.

Japanese Patent Laid-Open No. 2000-171875 discloses a television lens apparatus which adopts a current detection circuit in a television lens and can restrict the operation in accordance with the maximum current detection result. However, at least in measurement, a current larger than a current value suppliable from the television camera to the television lens may flow. Further, this reference does not describe the criterion of a peak current. For this reason, the maximum current detection result may exceed a range assured in the television camera.

The current value suppliable from the television camera to the television lens may change depending on the use status of the television camera or the power source state. However, according to the above-described conventional techniques, control of the television lens cannot quickly follow a change of the current capacity. When a plurality of current supply sources exist for the television lens, for example, when an auxiliary power source unit is directly mounted on the television lens, the television lens cannot always be controlled optimally.

Japanese Patent Laid-Open No. 2000-171875 discloses a method of suppressing the current consumption amount by stopping the zoom lens immediately before mechanical limitation. However, if the angle of the television lens changes while the zoom lens stops, the position of the zoom lens may change by its own weight.

DISCLOSURE OF INVENTION

The present invention has been made to solve the conventional drawbacks, and has as its object to provide a television camera system and television lens apparatus which always implement optimum control without any consciousness of the current capacities of a television camera and auxiliary power source unit and a change of the status of use.

To achieve the above-described objects, according to the first aspect of the present invention, there is provided a television camera system comprising a television lens apparatus and a television camera apparatus, the television camera apparatus comprising current supply means for supplying a current to the television lens apparatus, and current capacity information output means for outputting information of a capacity of current suppliable from the current supply means, and the television lens apparatus comprising current capacity information output determination means for determining whether the current capacity information output means has output the current capacity information, and current capacity information monitoring means for monitoring the current capacity information in accordance with determination of the current capacity information output determination means.

According to the second aspect of the present invention, there is provided a television lens apparatus detachable from a television camera apparatus having current supply means, and current capacity information output means for outputting information of a capacity of current suppliable from the current supply means, the television lens apparatus comprising current capacity information output determination means for determining whether the current capacity information output means has output the current capacity information, and current capacity information monitoring means for monitoring the current capacity information in accordance with determination of the current capacity information output determination means.

Further features of the present invention will become apparent from the following description of exemplary embodiments with reference to the attached drawings.

BRIEF DESCRIPTION OF DRAWINGS

FIG. 3 is a table for explaining zoom and focus driving patterns;

FIG. 6 is a table for explaining a high-speed zoom lens driving control pattern;

FIG. 8 is a flowchart showing processing; and

FIG. 9 is a table for explaining a control mode.

BEST MODE FOR CARRYING OUT THE INVENTION

Preferred embodiments of the present invention will be described in detail below with reference to the accompanying drawings.

First Embodiment

Figure 1:
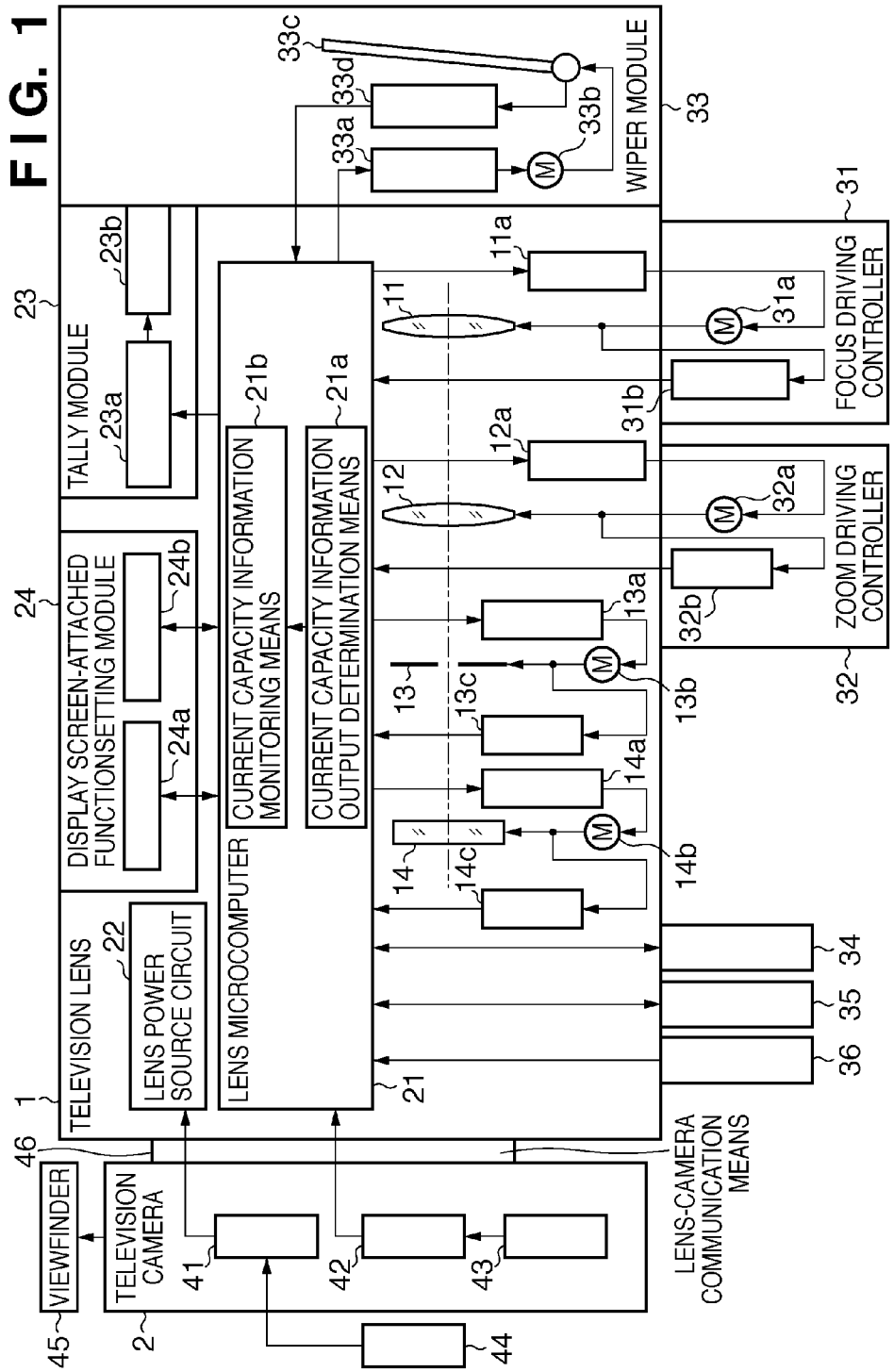
FIG. 1 is a block diagram showing the arrangement of a block circuit according to the first embodiment.

FIG. 1 is a block diagram showing the arrangement of a block circuit according to the first embodiment. A television lens 1 is exchangeably or fixedly mounted on a television camera 2. In the television lens 1, a focus lens 11, zoom lens 12, iris 13, and extender lens 14 are arrayed on the optical axis. The television lens 1 further incorporates a lens microcomputer 21, a lens power source circuit 22, a tally module 23, and a display screen-attached function setting module 24. A focus driving controller 31, zoom driving controller 32, wiper module 33, focus driving instruction input unit 34, zoom driving instruction input unit 35, and wiper driving instruction input unit 36 are externally attached to the television lens 1. The wiper module 33 is attached as an optional member to the television lens 1.

In the lens microcomputer 21 which restricts the respective functions of the television lens 1, the output of a current capacity information output determination means 21a is connected to a current capacity information monitoring means 21b. The focus driving controller 31 comprises a focus motor 31a which drives the focus lens 11, and a focus position detector 31b formed from an encoder, potentiometer, and the like. The output of the lens microcomputer 21 is connected to the focus motor 31a via a focus lens driver 11a. The output of the focus position detector 31b is connected to the lens microcomputer 21.

The zoom driving controller 32 comprises a zoom motor 32a and zoom position detector 32b. The output of the lens microcomputer 21 is connected to the zoom motor 32a via a zoom lens driver 12a. The output of the zoom position detector 32b is connected to the lens microcomputer 21.

The output of the lens microcomputer 21 is connected to an iris motor 13b via an iris driver 13a. The output of an iris position detector 13c is connected to the lens microcomputer 21. The output of the lens microcomputer 21 is connected to an extender motor 14b via an extender driver 14a. The output of an extender position detector 14c is connected to the lens microcomputer 21.

In the tally module 23, the output of the lens microcomputer 21 is connected to a tally driver 23a, and the output of the tally driver 23a is connected to a tally light-emitting portion 23b. The display screen-attached function setting module 24 comprises a function setting unit 24a and display screen 24b, which are mutually connected to the lens microcomputer 21.

In the wiper module 33, the output of the lens microcomputer 21 is connected to a wiper driver 33a and to a wiper 33c via a wiper motor 33b. The output of a wiper position detector 33d is connected to the lens microcomputer 21.

The focus driving instruction input unit 34 and zoom driving instruction input unit 35 are mutually connected to the lens microcomputer 21. The output of the wiper driving instruction input unit 36 is connected to the lens microcomputer 21.

The television camera 2 incorporates a camera power source circuit 41, camera microcomputer 42, and iris driving instruction input unit 43. A power source 44 and viewfinder 45 are externally attached to the television camera 2. The output of the iris driving instruction input unit 43 is connected to the lens microcomputer 21 of the television lens 1 via the camera microcomputer 42 and a lens-camera communication means 46. The output of the power source 44 via the camera power source circuit 41 is connected to the lens power source circuit 22 via the lens-camera communication means 46.

The focus driving controller 31 of the television lens 1 controls to drive the focus lens 11 in accordance with an instruction from the lens microcomputer 21. The focus motor 31a receives an output from the focus lens driver 11a to drive the focus lens 11. The focus position detector 31b detects the position of the focus lens 11, and feeds it back to the lens microcomputer 21.

The zoom driving controller 32 controls to drive the zoom lens 12 in accordance with an instruction from the lens microcomputer 21. The zoom motor 32a receives an output from the zoom lens driver 12a to drive the zoom lens 12. The zoom position detector 32b detects the position of the zoom lens 12, and feeds it back to the lens microcomputer 21.

The iris driver 13a drives the iris motor 13b of the iris 13 in accordance with an instruction from the lens microcomputer 21. The iris position detector 13c detects the position of the iris 13, and feeds it back. The extender driver 14a drives the extender motor 14b of the extender lens 14. The extender position detector 14c detects the position of the extender lens 14, and feeds it back.

The tally driver 23a of the tally module 23 causes the tally light-emitting portion 23b to emit light in accordance with an instruction from the lens microcomputer 21. The tally light-emitting portion 23b emits light or stops light emission, functioning as an indicator of whether the camera is in use for broadcasting.

The function setting unit 24a of the display screen-attached function setting module 24 can set various functions in accordance with an instruction from the lens microcomputer 21. When suppressing power consumption of the television lens 1, the function setting unit 24a can also inhibit simultaneously operating a plurality of functions. The display screen 24b displays the result of setting various functions by the function setting unit 24a.

The wiper driver 33a of the wiper module 33 drives the wiper motor 33b in accordance with an instruction from the lens microcomputer 21. The wiper motor 33b receives an output from the wiper driver 33a to drive the wiper 33c which wipes raindrops. The wiper position detector 33d detects the position of the wiper 33c, and feeds it back to the lens microcomputer 21.

The focus driving instruction input unit 34 allows the user to input an instruction to drive the focus lens 11. The zoom driving instruction input unit 35 allows the user to input an instruction to drive the zoom lens 12. The wiper driving instruction input unit 36 allows the user to input an instruction to drive the wiper 33c.

Based on a current supplied from the power source 44, the camera power source circuit 41 generates a necessary current to be consumed by each function of the television camera 2 or television lens 1. The lens power source circuit 22 receives supply of a current from the camera power source circuit 41 via the lens-camera communication means 46, and generates a necessary current to be consumed by each function of the television lens 1. The lens-camera communication means 46 allows the television camera 2 and television lens 1 to transmit/receive information by serial communication, parallel communication, an analog signal, and the like.

The current capacity information output determination means 21a of the lens microcomputer 21 determines whether the camera microcomputer 42 has output, via the lens-camera communication means 46, information of the capacity of current suppliable from the television camera 2 to the television lens 1. The current capacity information monitoring means 21b monitors information of the capacity of current suppliable from the television camera 2 to the television lens 1, and a change of the information.

Figure 2:
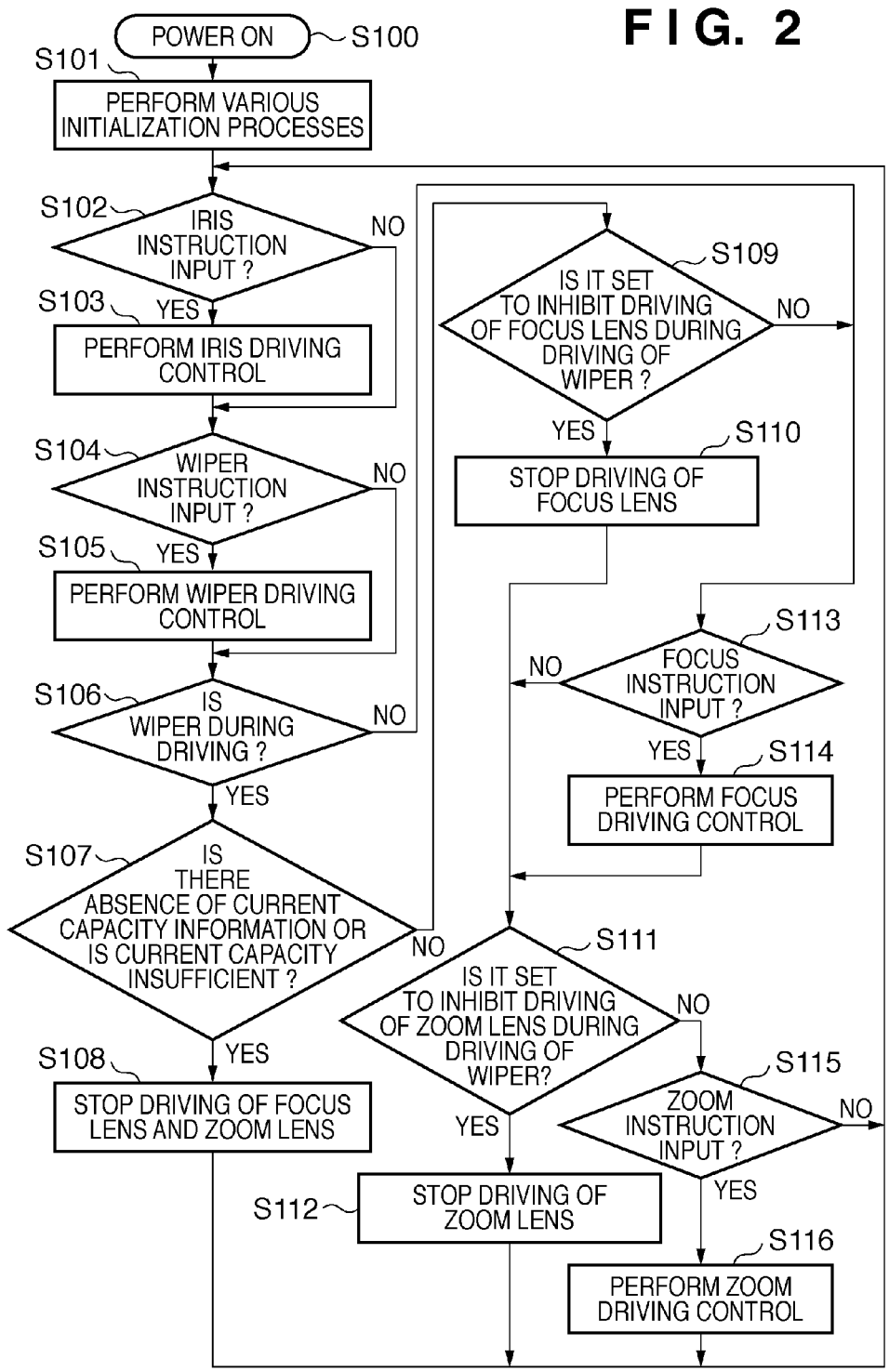
FIG. 2 is a flowchart showing processing.

FIG. 2 is a flowchart showing processing by the lens microcomputer 21. In step S100, the process starts upon power-on. In step S101, when a relative position detection means such as an encoder is used for the focus position detector 31b, zoom position detector 32b, and the like, the lens microcomputer 21 performs various initialization processes to, for example, acquire an absolute position.

In step S102, the lens microcomputer 21 determines whether an iris driving instruction has been input to the iris driving instruction input unit 43 of the television camera 2 via the camera microcomputer 42 and lens-camera communication means 46. If the lens microcomputer 21 determines that an iris driving instruction has been input, the process shifts to step S103 to perform iris driving control. If the lens microcomputer 21 determines that no iris driving instruction has been input, the process shifts to step S104. In step S104, the lens microcomputer 21 determines whether a wiper driving instruction has been input from the wiper driving instruction input unit 36. If the lens microcomputer 21 determines that a wiper driving instruction has been input, the process shifts to step S105 to perform wiper driving control. If the lens microcomputer 21 determines that no wiper driving instruction has been input, the process shifts to step S106.

In step S106, the lens microcomputer 21 determines whether the wiper 33c is during driving. If the lens microcomputer 21 determines that the wiper 33c is during driving, the process shifts to step S107. If the lens microcomputer 21 determines that the wiper 33c is not during driving, the process shifts to step S113. Since driving the wiper 33c requires a large current, the current capacity information output determination means 21a determines in step S107 whether information of the capacity of current suppliable from the television camera 2 to the television lens 1 has been output via the lens-camera communication means 46. Also in step S107, the current capacity information monitoring means 21b monitors the current capacity information. If no current capacity information has been output or the current capacity is small, the lens microcomputer 21 determines that the capacity of current suppliable from the television camera 2 to the television lens 1 is as small as, for example, 2 A or less. Then, the process shifts to step S108 to set function restriction, and stop driving control of the focus lens 11 and zoom lens 12.

In step S107, the lens microcomputer 21 determines that the current capacity information has been output, and the capacity of current suppliable from the television camera 2 to the television lens 1 is as large as, for example, 3 to 4 A, the process shifts to step S109. In step S109, the lens microcomputer 21 determines, from a setting change in the function setting unit 24a, whether it is set in advance to inhibit driving of the focus lens 11 during driving of the wiper 33c. If the lens microcomputer 21 determines that it is set to inhibit driving of the focus lens 11 during driving of the wiper 33c, the process shifts to step S110 to stop driving the focus lens 11, and then to step S111.

If the lens microcomputer 21 determines in step S109 that it is not set to inhibit driving of the focus lens 11 during driving of the wiper 33c, the process shifts to step S113. In step S113, the lens microcomputer 21 determines whether a focus driving instruction has been input from the focus driving instruction input unit 34. If the lens microcomputer 21 determines that a focus driving instruction has been input, the process shifts to step S114 to perform driving control of the focus lens 11. If the lens microcomputer 21 determines that no focus driving instruction has been input, the process shifts to step S111.

In step S111, the lens microcomputer 21 determines whether it is set in advance by the function setting unit 24a or the like to inhibit driving of the zoom lens 12 during driving of the wiper 33c. If the lens microcomputer 21 determines that it is set to inhibit driving of the zoom lens 12 during driving of the wiper 33c, the process shifts to step S112 to stop driving of the zoom lens 12. Then, the process returns to step S102 to repeat the same processing.

If the lens microcomputer 21 determines in step S111 that it is not set to inhibit driving of the zoom lens 12 during driving of the wiper 33c, the process shifts to step S115.

In step S115, the lens microcomputer 21 determines whether a zoom driving instruction has been input from the zoom driving instruction input unit 35. If the lens microcomputer 21 determines that a zoom driving instruction has been input, the process shifts to step S116 to perform driving control of the zoom lens 12. If the lens microcomputer 21 determines in step S115 that no zoom driving instruction has been input, the process returns to step S102 to repeat the same processing.

As shown in FIG. 3, the driving patterns of the focus lens 11 and zoom lens 12 corresponding to respective conditions are obtained. When the television camera 2 outputs current capacity information and the current capacity is large, the user can arbitrarily set whether to permit or inhibit driving of the focus lens 11 and zoom lens 12 during driving of the wiper 33c. When the television camera 2 outputs current capacity information and the capacity of current supplied from the television camera 2 to the television lens 1 is small, it is inhibited to drive the focus lens 11 and zoom lens 12 during driving of the wiper 33c. This also applies to a case where the television camera 2 does not output current capacity information.

In this manner, when the television lens 1 is mounted on the television camera 2 which does not output current capacity information, it can be automatically inhibited to drive the focus lens 11 and zoom lens 12 during driving of the wiper 33c. It can be arbitrarily set and automatically switched in accordance with current capacity information from the television camera 2 whether to inhibit or permit driving of the focus lens 11 and zoom lens 12 during driving of the wiper 33c.

The user can control the television lens 1 by fully using the current without any consciousness of the type of the television camera 2 on which the television lens 1 is mounted, and without exceeding the capacity of current suppliable from the television camera 2 to the television lens 1. Also when the capacity of current suppliable from the television camera 2 to the television lens 1 has changed depending on the use status of the television camera 2, for example, when the brightness of the viewfinder 45 is adjusted, optimum control is always possible without wasting the current or exceeding the current capacity. Further, the possibility of the failure of the television camera 2 upon exceeding the capacity of current suppliable from the television camera 2 to the television lens 1 can be greatly reduced.

The first embodiment has described only information on whether current capacity information has been output and whether the current capacity is sufficient. However, it is also possible to replace the current capacity with multilevel information in serial communication or the like, and switch control of the television lens 1 between a plurality of modes in correspondence with the information. Current capacity information is always output in the above description, but output of it may also be requested only when the camera microcomputer 42 requires the information. The television camera 2 can also output current capacity information only when the current capacity information has changed upon power-on or mounting the television lens 1.

When the wiper 33c is driven, it is inhibited or permitted to simultaneously perform focus or zoom driving, but it may also be inhibited or permitted to simultaneously operate an image stabilization function, AF function, and other functions, thereby controlling current consumption of the television lens 1. It is also possible to suppress current consumption by restricting the driving speed of the focus lens 11 or zoom lens 12. When inhibiting driving of the focus lens 11 or zoom lens 12, a position immediately before the inhibition may also be held. In this case, when the posture of the television lens 1 has changed, the movement of the television lens 1 by its own weight can also be restricted. The same processing can also be done for the functions of the extender lens 14 and the like.

Second Embodiment

Figure 4:
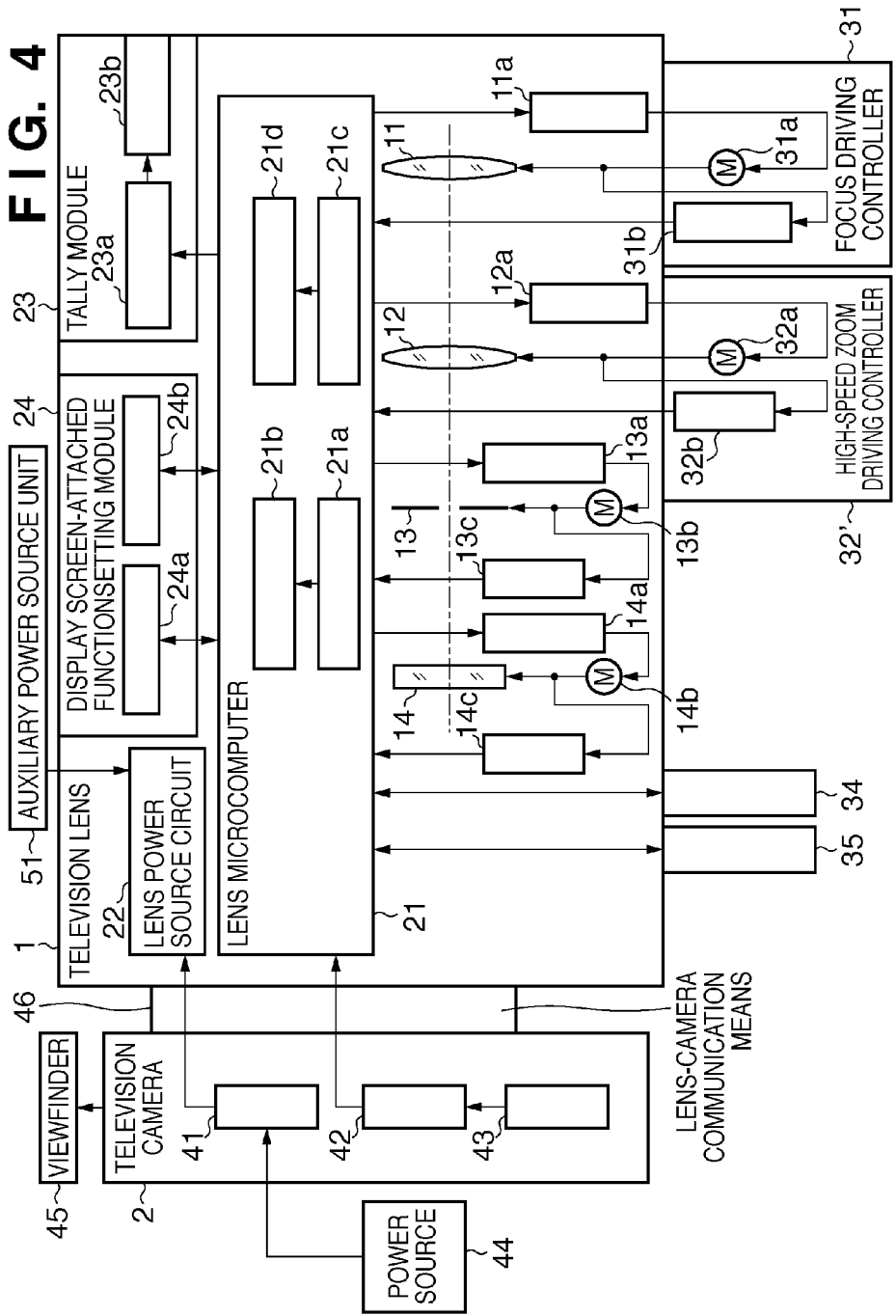
FIG. 4 is a block diagram showing the arrangement of a block circuit according to the second embodiment.

FIG. 4 is a block diagram showing the arrangement of a block circuit according to the second embodiment. The same reference numerals as those in FIG. 1 denote the same parts. A lens microcomputer 21 further comprises a second current capacity information output determination means 21c and second current capacity information monitoring means 21d. The output of the second current capacity information output determination means 21c is connected to the second current capacity information monitoring means 21d. A lens power source circuit 22 is connected to an auxiliary power source unit 51 externally detachable from a television lens 1. A high-speed zoom driving controller 32' replaces the zoom driving controller 32. The wiper module 33 and wiper driving instruction input unit 36 are omitted.

The auxiliary power source unit 51 has the first case where the auxiliary power source unit 51 can supply a current up to a current capacity necessary to drive the high-speed zoom driving controller 32' at a maximum speed of 0.6 sec in the entire area, or does not have a function of transmitting information of the capacity of current suppliable to the television lens 1. The auxiliary power source unit 51 also has the second case where the auxiliary power source unit 51 can supply a current up to a current capacity necessary to high-speed driving at a maximum speed of 0.1 sec in the entire area, and has a function of transmitting information of the capacity of current suppliable to the television lens 1.

The second current capacity information output determination means 21c determines whether the auxiliary power source unit 51 has output information of the capacity of current suppliable to the television lens 1. The second current capacity information monitoring means 21d monitors information of the capacity of current suppliable from the auxiliary power source unit 51 to the television lens 1, and a change of the information. The high-speed zoom driving controller 32' can drive a zoom lens 12 at high speed. By setting a large current limiting value for a zoom lens driver 12a, a zoom motor 32a rotates the zoom lens 12 at high speed.

The auxiliary power source unit 51 mounted on the television lens 1 is mainly used to compensate for supply shortage of a current capacity from a television camera 2 when the high-speed zoom driving controller 32' is mounted on the television lens 1.

Figure 5:
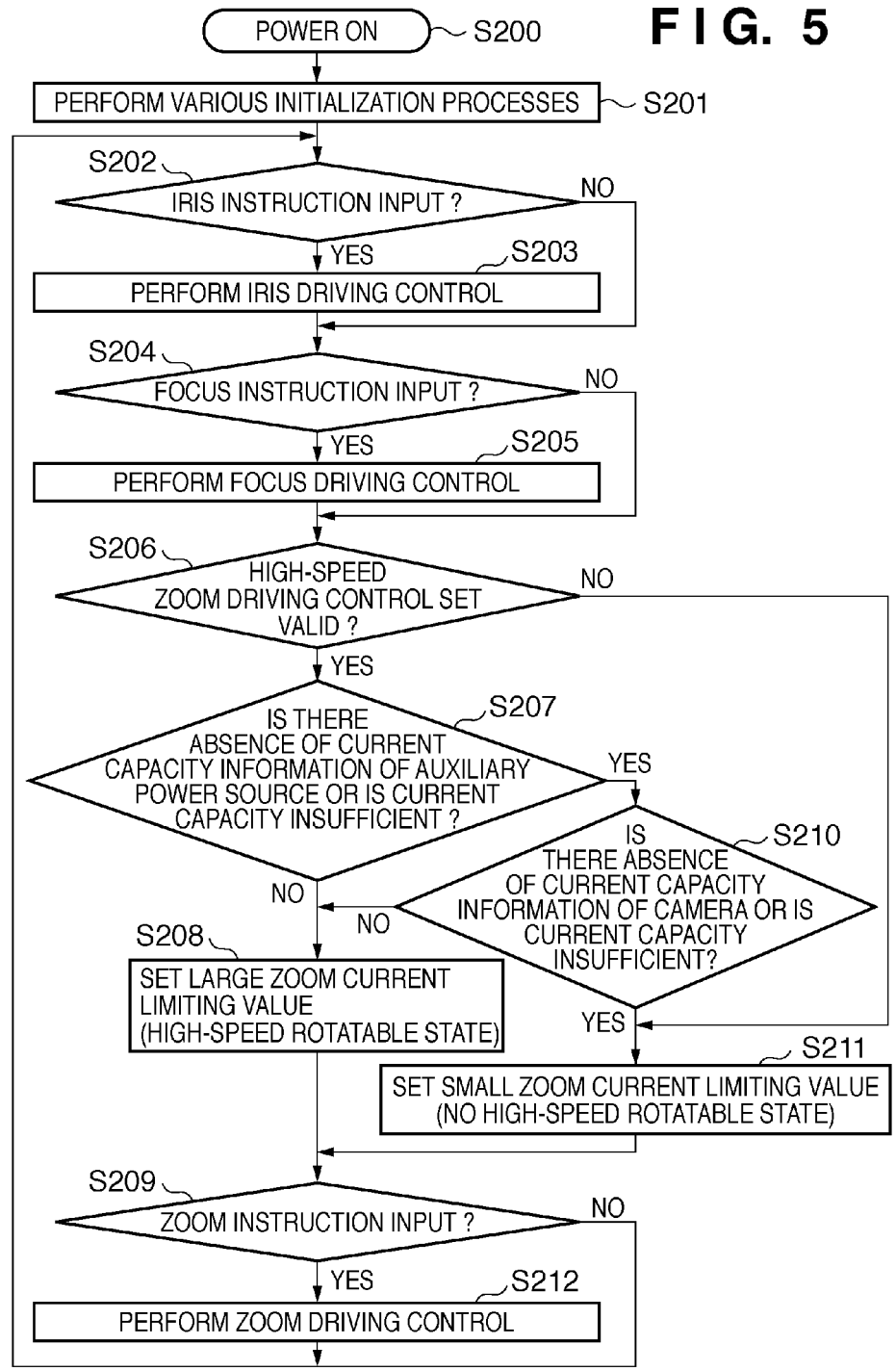
FIG. 5 is a flowchart showing processing.

FIG. 5 is a flowchart showing processing by the lens microcomputer 21. Steps S201 to S203 are the same as steps S101 to S103 in FIG. 2. In step S204, the lens microcomputer 21 determines whether a focus driving instruction has been input from a focus driving instruction input unit 34. If the lens microcomputer 21 determines that a focus driving instruction has been input, the process shifts to step S205 to perform driving control of a focus lens 11. If the lens microcomputer 21 determines in step S204 that no focus driving instruction has been input, the process shifts to step S206.

In step S206, the lens microcomputer 21 determines whether the high-speed zoom driving controller 32' is set valid by a function setting unit 24a of a display screen-attached function setting module 24 or the like. If the lens microcomputer 21 determines that high-speed driving of the high-speed zoom driving controller 32' is set valid, the process shifts to step S207. If the lens microcomputer 21 determines that high-speed driving of the high-speed zoom driving controller 32' is set invalid, the process shifts to step S211.

In step S207, the lens microcomputer 21 determines whether the auxiliary power source unit 51 has output information of a suppliable current capacity. If the lens microcomputer 21 determines that the auxiliary power source unit 51 has output current capacity information and the current capacity is large, it determines that the auxiliary power source unit 51 is in the second case, and the process shifts to step S208. If the lens microcomputer 21 determines in step S207 that the auxiliary power source unit 51 has not output the current capacity information, or the current capacity is small, it determines that the auxiliary power source unit 51 is in the first case, and the process shifts to step S210. In step S208, the lens microcomputer 21 sets a large zoom current limiting value to set a state in which the zoom motor 32a can rotate at high speed. Then, the process shifts to step S209.

In step S210, the lens microcomputer 21 determines whether the television camera 2 has output information of a suppliable current capacity. If the lens microcomputer 21 determines that the television camera 2 has output the current capacity information, it determines that the capacity of current supplied from the television camera 2 to the television lens 1 is as large as, for example, 3 to 4 A, and the process shifts to step S208. If the lens microcomputer 21 determines that the television camera 2 has not output current capacity information, or the current capacity is small, it determines that the capacity of current supplied from the television camera 2 to the television lens 1 is smaller than, for example, 2 A, and the process shifts to step S211.

In step S211, the lens microcomputer 21 sets a small zoom current limiting value to impose function restriction so that the zoom motor 32a cannot rotate at high speed. Then, the process shifts to step S209. In step S209, the lens microcomputer 21 determines whether a zoom driving instruction has been input from the zoom driving instruction input unit 35. If the lens microcomputer 21 determines that a zoom driving instruction has been input, the process shifts to step S212 to perform high-speed zoom driving control, and then returns to step S202. Even if the lens microcomputer 21 determines in step S209 that no zoom driving instruction has been input, the process returns to step S202 to repeat the same processing.

FIG. 6 shows high-speed zoom driving control patterns corresponding to respective conditions in the second embodiment. When the television camera 2 outputs current capacity information and the current capacity is large, high-speed zoom driving control is permitted regardless of whether current capacity information of the auxiliary power source unit 51 has been output or whether the current capacity is large or small. When current capacity information of the television camera 2 is output and the current capacity is small, high-speed zoom driving control is permitted only in the second case where current capacity information of the auxiliary power source unit 51 is output and the current capacity is large. When current capacity information of the television camera 2 is output and the current capacity is small, high-speed zoom driving control is inhibited in the first case where current capacity information of the auxiliary power source unit 51 is output and the current capacity is small, and in a case where current capacity information of the auxiliary power source unit 51 is not output.

When current capacity information of the television camera 2 is not output, high-speed zoom driving control is permitted only in the second case where current capacity information of the auxiliary power source unit 51 is output and the current capacity is large. When current capacity information of the television camera 2 is not output, high-speed zoom driving control is inhibited in a case where current capacity information of the auxiliary power source unit 51 is output and the current capacity is small, and in the first case where current capacity information of the auxiliary power source unit 51 is not output.

When the auxiliary power source unit 51 is used without outputting current capacity information from the television camera 2, high-speed zoom control can be inhibited. When current capacity information is output to reveal that the current capacity of the television camera 2 is small, the auxiliary power source unit 51 which outputs current capacity information and has a small current capacity is used. In this case, high-speed zoom control can be inhibited to perform the control under a predetermined limitation on the maximum speed. When either or both of the television camera 2 and auxiliary power source unit 51 output current capacity information, the current capacity is large, and high-speed driving of the high-speed zoom driving controller 32' is set valid by the function setting unit 24a or the like, the zoom lens 12 can be driven at high speed.

The user can restrict an excess over the capacity of current suppliable to the television lens 1 without any consciousness of the types and specifications of the auxiliary power source unit 51 and television camera 2. The driving speed is set high when a sufficient current can be supplied, and normal when no sufficient current can be supplied. Hence, control fully using a current supply amount can be achieved. When the supply current capacity has changed, for example, when the auxiliary power source unit 51 is unexpectedly disconnected, high-speed zoom control automatically switches to a normal-speed one. This can greatly reduce the possibility of the failure of the television camera 2.

In the second embodiment, if it is determined that either the power source 44 of the television camera 2 or the auxiliary power source unit 51 has a large current capacity, high-speed zoom driving control is permitted. It is also possible to permit high-speed zoom driving control only when it is determined that both of the power source 44 of the television camera 2 and the auxiliary power source unit 51 have large current capacities. The second embodiment has described only information on whether current capacity information has been output and whether the current capacity is sufficient. However, it is also possible to replace the current capacity with multilevel information in serial communication or the like, and switch control of the television lens 1 between a plurality of modes in correspondence with the information.

The auxiliary power source unit 51 and television camera 2 may also output current capacity information only when the current capacity information has changed upon power-on, mounting the auxiliary power source unit 51, or mounting the television lens 1.

Third Embodiment

Figure 7:
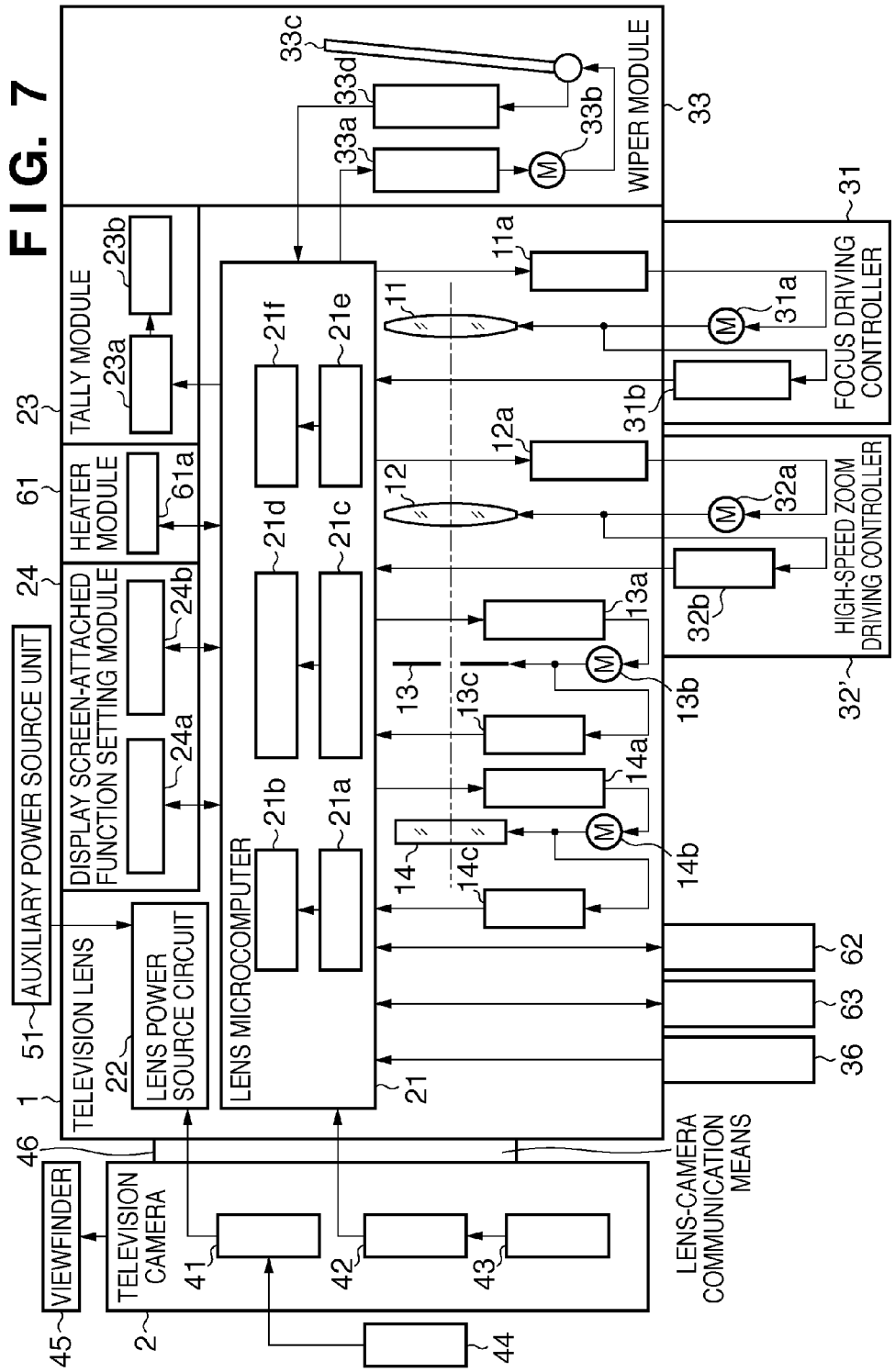
FIG. 7 is a block diagram showing the arrangement of a block circuit according to the third embodiment.

FIG. 7 is a block diagram showing the arrangement of a block circuit according to the third embodiment. The same reference numerals as those in FIGS. 1 and 4 denote the same parts. A lens microcomputer 21 further comprises an option connection status determination means 21e and current consumption prediction means 21f. The output of the option connection status determination means 21e is connected to the current consumption prediction means 21f. A television lens 1 incorporates a heater module 61 as an optional member. A heater 61a serving as a heating element in the heater module 61 is mutually connected to the lens microcomputer 21. A display screen-attached focus driving instruction input unit 62 and display screen-attached zoom driving instruction input unit 63 replace the focus driving instruction input unit 34 and zoom driving instruction input unit 35.

The option connection status determination means 21e of the lens microcomputer 21 determines the type of optional member such as a high-speed zoom driving controller 32', a wiper module 33, or the heater module 61, and recognizes whether the optional member is mounted on the television lens 1. Based on the operation state of the display screen-attached zoom driving instruction input unit 63 or the like and the determination result of the option connection status determination means 21e, the current consumption prediction means 21f calculates and predicts the total amount of current which may be consumed by the television lens 1.

In use in a cold district or outdoor use in winter, the heater module 61 is mounted in the television lens 1 in order to prevent fogging of a lens. The display screen-attached focus driving instruction input unit 62 has a function of changing settings while confirming the setting states of various functions mainly via a liquid crystal display or the like. The display screen-attached zoom driving instruction input unit 63 has a function of changing settings while confirming the setting states of various functions mainly via a liquid crystal display or the like.

FIG. 8 is a flowchart showing processing by the lens microcomputer 21. Steps S300 and S301 are the same as steps S100 and S101 in FIG. 2. In step S302, a current capacity information output determination means 21a and current capacity information monitoring means 21b calculate the capacity of current suppliable from a television camera 2 to the television lens 1. Then, the process shifts to step S303. In step S303, a second current capacity information output determination means 21c and second current capacity information monitoring means 21d calculate the capacity of current suppliable from an auxiliary power source unit 51 to the television lens 1. Then, the process shifts to step S304. In step S304, the lens microcomputer 21 adds the current capacities calculated in steps S302 and S303, and the process shifts to step S305. In step S305, the option connection status determination means 21e confirms connected, selected, and operated functions, and the process shifts to step S306.

In step S306, the current consumption prediction means 21f calculates a total current consumption amount on the basis of the functions confirmed in step S305, and the process shifts to step S307. In step S307, the lens microcomputer 21 calculates the difference between the total suppliable current capacity calculated in step S304 and the total current consumption amount. If the difference is smaller than 0, the process shifts to step S308. If the difference is equal to or larger than 0, the process shifts to step S309.

In step S308, the lens microcomputer 21 increments a preset control mode ID number (to be described later) by one, and the process returns to step S307. In step S309, the lens microcomputer 21 decrements the control mode ID number by one, and the process shifts to step S310. In step S310, the lens microcomputer 21 controls a zoom lens 12, a focus lens 11, an iris 13, an extender lens 14, a wiper 33c, the heater 61a, and the like in accordance with a set control mode and instructions to drive respective functions, operating the auto focus function and image stabilization function.

FIG. 9 is a table for explaining the control mode ID number in steps S308 and S309. Z, F, I, IE, AF, IS, HS, WP, and HT respectively represent controlled objects of zoom driving, focus driving, iris driving, extender driving, auto focus control, image stabilization control, high-speed zoom driving, wiper driving, and heater control. A, B, C, and D respectively represent permission of simultaneous driving, conditional permission of simultaneous driving except a case where the current has reached a peak, permission of only single control, and inhibition of driving. ZD and FD represent the display screen-attached focus driving instruction input unit 62 and display screen-attached zoom driving instruction input unit 63, respectively.

a, b, c, and d represent "all functions =valid", "decrease in display brightness", "LED=invalid", and "display=invalid", respectively. The number on the left side represents a control mode ID number. A smaller control mode ID number means a larger total amount of current consumed by the television lens 1. A larger control mode ID number means a smaller total amount of current consumed by the television lens 1.

In the third embodiment, an optimum control mode can be selected from the table of FIG. 9 by comparing the total capacity of current supplied to the television lens 1 with the total amount of current consumed by the television lens 1. The control mode can always switch to a more optimum one by monitoring not only a change in the state of the current supply side but also a change in the state of the current consumption side such as the use state of the heater 61a.

Accordingly, the control mode can automatically switch to an optimum one in which the current can be satisfactorily consumed without exceeding the current supply amount at any time, without any consciousness of the specifications and use statuses of the television camera 2 and auxiliary power source unit 51 and the connection and use status of an optional member such as the heater 61a.

The third embodiment has described merely an example of the control mode, but the priority levels of respective functions and function restriction methods can be combined in various ways. The condition for switching the control mode is that the difference between the suppliable current capacity and the total current consumption amount is 0. Alternatively, the control mode may also be switched depending on whether the current is equal to or larger than a preset value or smaller than it. This can suppress unnecessarily switching the control mode at a peak current or the like.

The control mode is set in advance in the above description, but may also be arbitrarily set by the user. A control mode during photographing may also be displayed on the viewfinder 45, the display of the display screen-attached zoom driving instruction input unit 63, or the like.

Preferred embodiments of the present invention have been described, but the present invention is not limited to these embodiments. The present invention can be variously modified and changed without departing from the scope of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-258293, filed Oct. 2, 2007, which is hereby incorporated by reference herein in its entirety.

The invention claimed is:

1. A television camera system comprising:
a television lens apparatus and a television camera apparatus;
the television camera apparatus comprising current supply means for supplying a current to the television lens apparatus, and current capacity information output means for outputting information of a capacity of current suppliable from the current supply means; and
the television lens apparatus comprising current capacity information monitoring means for monitoring an information of a capacity of current from the television camera apparatus, a detachable auxiliary power source unit configured to supply a current, second current capacity information output means for outputting information of a capacity of current suppliable from the auxiliary power source unit, second current capacity information monitoring means for monitoring the information of the capacity of current from the auxiliary power source unit, and function restriction means restricting predetermined set functions such that a current value which is obtained by subtracting a current consumption value of the television lens apparatus from a sum total capacity of current, which is suppliable from the television camera apparatus and the auxiliary power source unit and is monitored by the current capacity information monitoring means and the second current capacity information monitoring means, becomes not less than a predetermined current value.

2. A television lens apparatus detachable from a television camera apparatus comprising current supply means for supplying a current, and current capacity information output means for outputting information of a capacity of current suppliable from the current supply means, comprising:
current capacity information monitoring means for monitoring an information of a capacity of current from the television camera apparatus;
a detachable auxiliary power source unit configured to supply a current;
second current capacity information output means for outputting information of a capacity of current suppliable from the auxiliary power source unit;
second current capacity information monitoring means for monitoring the information of the capacity of current from the auxiliary power source unit; and
function restriction means for restricting predetermined set functions such that a current value which is obtained by subtracting a current consumption value of the television lens apparatus from a sum total capacity of current, which is suppliable from the television camera apparatus and the auxiliary power source unit and is monitored by the current capacity information monitoring means and the second current capacity information monitoring means, becomes not less than a predetermined current value.

3. The apparatus according to claim 2, further comprising at least one optional member, option connection status determination means for outputting a type of the optional member, and current consumption prediction means for calculating a current consumption value on the basis of a determination result by the option connection status determination means.

4. The apparatus according to claim 3, wherein the function restriction means has at least two control modes in which functions are restricted by combinations of controlled objects such that a current value which is obtained by subtracting a current consumption value of the television lens apparatus, which is obtained by the current consumption prediction means, from a sum total capacity of current, which is suppliable from the television camera apparatus and the auxiliary power source unit and is monitored by the current capacity information monitoring means and the second current capacity information monitoring means, becomes not less than a predetermined current value.

5. The apparatus according to claim 4, wherein the control mode is set by combining zoom driving, focus driving, iris driving, extender driving, auto focus control, image stabilization control, high-speed zoom driving, wiper driving, and heater control.

6. The apparatus according to claim 2, wherein the function restriction means allows changing a setting of the function.

* * * * *